United States Patent
Hidaka

(10) Patent No.: US 10,781,733 B2
(45) Date of Patent: Sep. 22, 2020

(54) ENGINE DEVICE

(71) Applicant: Yanmar Co., Ltd., Osaka-shi, Osaka-fu (JP)

(72) Inventor: Hiromitsu Hidaka, Osaka (JP)

(73) Assignee: YANMAR POWER TECHNOLOGY CO., LTD., Osaka (JP)

( * ) Notice: Subject to any disclaimer, the term of this patent is extended or adjusted under 35 U.S.C. 154(b) by 44 days.

(21) Appl. No.: 15/779,027

(22) PCT Filed: Nov. 22, 2016

(86) PCT No.: PCT/JP2016/084624
§ 371 (c)(1),
(2) Date: May 24, 2018

(87) PCT Pub. No.: WO2017/090619
PCT Pub. Date: Jun. 1, 2017

(65) Prior Publication Data
US 2018/0340455 A1 Nov. 29, 2018

(30) Foreign Application Priority Data

Nov. 25, 2015 (JP) ................................. 2015-229903

(51) Int. Cl.
*F01N 3/035* (2006.01)
*F01N 3/10* (2006.01)
(Continued)

(52) U.S. Cl.
CPC .............. *F01N 3/035* (2013.01); *B60K 13/04* (2013.01); *F01N 3/101* (2013.01); *F01N 3/2882* (2013.01);
(Continued)

(58) Field of Classification Search
CPC combination set(s) only.
See application file for complete search history.

(56) References Cited

U.S. PATENT DOCUMENTS 6,632,406 B1  10/2003  Michelin et al.
9,255,517 B2 *  2/2016  Nishimura .......... F01N 13/1805
(Continued)

FOREIGN PATENT DOCUMENTS

EP    2336517 A1    6/2011
JP    1984-123609 U    8/1984
(Continued)

OTHER PUBLICATIONS

Supplementary European Search Report dated Oct. 18, 2018 to corresponding European Patent Application No. 16868562.6.
(Continued)

*Primary Examiner* — Binh Q Tran
(74) *Attorney, Agent, or Firm* — Norton Rose Fulbright US LLP

(57) ABSTRACT

An engine device of this invention includes including a post-treatment device, provided in an exhaust passage of an engine, for purifying an exhaust gas from the engine. As the post-treatment device, a three-way catalyst is used. The engine device further includes a filter case including a filter body for catching deposits in the exhaust gas. The filter case is disposed, in a replaceable manner, upstream of the post-treatment device in the exhaust passage.

10 Claims, 11 Drawing Sheets

(51) Int. Cl.
  *F01N 13/00*  (2010.01)
  *B60K 13/04*  (2006.01)
  *F01N 11/00*  (2006.01)
  *F01N 13/18*  (2010.01)
  *F01N 3/28*   (2006.01)

(52) U.S. Cl.
  CPC .......... *F01N 11/002* (2013.01); *F01N 13/009* (2014.06); *F01N 13/1805* (2013.01); *B60Y 2200/14* (2013.01); *B60Y 2400/302* (2013.01); *B60Y 2400/306* (2013.01); *F01N 2250/02* (2013.01); *F01N 2340/02* (2013.01); *F01N 2450/30* (2013.01); *F01N 2550/04* (2013.01); *F01N 2560/06* (2013.01); *F01N 2560/08* (2013.01); *F01N 2900/1404* (2013.01); *F01N 2900/1406* (2013.01); *Y02T 10/22* (2013.01); *Y02T 10/47* (2013.01)

(56) References Cited

U.S. PATENT DOCUMENTS

| | | | |
|---|---|---|---|
| 9,624,814 B2 * | 4/2017 | Mitsuda | E02F 9/0891 |
| 10,221,756 B2 * | 3/2019 | Music | F01N 13/1805 |
| 2011/0000199 A1 * | 1/2011 | Ezawa | B01D 46/0002 60/311 |
| 2012/0102932 A1 * | 5/2012 | Mitsuda | F01N 3/0211 60/311 |
| 2013/0118164 A1 | 5/2013 | Schwarz | |
| 2015/0240698 A1 * | 8/2015 | Nishimura | F01N 13/1805 60/278 |
| 2017/0030247 A1 * | 2/2017 | Suetou | F01N 13/18 |

FOREIGN PATENT DOCUMENTS

| | | | | |
|---|---|---|---|---|
| JP | 5-038421 A | 2/1993 | | |
| JP | 2002-256859 A | 9/2002 | | |
| JP | 2008-008516 A1 | 1/2008 | | |
| JP | 4710846 B2 | 4/2011 | | |
| JP | 2014-065694 | * | 3/2014 | ............ F01N 13/18 |
| JP | 2014-173516 A | 9/2014 | | |
| JP | 5584487 B2 | 9/2014 | | |
| WO | 98/12424 A1 | 3/1998 | | |
| WO | 2010130909 A1 | 11/2010 | | |

OTHER PUBLICATIONS

International Search Report dated Dec. 20, 2016 issued in corresponding PCT Application PCT/JP2016/084624.

* cited by examiner

ENGINE DEVICE

CROSS REFERENCES TO RELATED APPLICATIONS

This application is a national stage application pursuant to 35 U.S.C. § 371 of International Application No. PCT/JP2016/084624, filed on Nov. 22, 2016, which claims priority under 35 U.S.C. § 119 to Japanese Patent Application No. 2015-229903, filed on Nov. 25, 2015, the disclosures of which are hereby incorporated by reference in their entireties.

TECHNICAL FIELD

The present invention relates to an engine device to be mounted in, e.g., cargo containers and various vehicles, more specifically to an engine device including a post-treatment device provided in an exhaust passage, the post-treatment device being configured to purify an exhaust gas from an engine.

BACKGROUND ART

Traditionally, there is a known technique according to which a catalyst case (post-treatment device) including a three-way catalyst is provided in an exhaust passage of an engine so that three components (hydrocarbon (HC), carbon monoxide (CO), nitrogen oxide (NOx)) in an exhaust gas emitted from the engine are purified by the three-way catalyst (see, e.g., Patent Literatures 1 and 2 (hereinafter, referred to as PTLs 1 and 2)). There is another well-known technique according to which an air conditioner for refrigeration and an engine for driving the air conditioner are mounted in a cargo container with which a cargo and/or the like is transported, an internal temperature of the container is maintained to be equal to or lower than a temperature required to preserve the cargo in a frozen state, and the cargo preserved in the frozen state is transported in the cargo container connected to a tractor (see, e.g., Patent Literature 3 (hereinafter, referred to as PTL 3)).

CITATION LIST

Patent Literature
 PTL 1: Japanese Patent No. 4710846
 PTL 2: Japanese Patent No. 5584487
 PTL 3: Japanese Patent Application Laid-Open No. 2008-8516

SUMMARY OF INVENTION

Technical Problem

Incidentally, an exhaust gas from an engine contains deposits that are residues (fuel products) of, e.g., engine oil responsible for lubrication and cooling of the engine. A combustion temperature in a gas engine is lower than that in a gasoline engine. Therefore, deposits generated as combustion products of lubrication oil in the gasoline engine are dry, whereas such deposits generated in the gas engine have a high viscosity. This may increase the possibility that the three-way catalyst might be clogged, which may shorten the life of the three-way catalyst, disadvantageously.

Specifically, when an exhaust gas temperature of the gas engine whose main fuel is a gas such as a methane gas is low, the viscosity of deposits in the exhaust gas is high. This may cause concern that the deposits might be adhered to and accumulated in the three-way catalyst in the catalyst case in the exhaust passage and accordingly the three-way catalyst might be likely to be clogged. For example, in many cases, the engine in the cargo container is continuously driven at a relatively low speed for a long period, and therefore an exhaust gas temperature does not become so high. Therefore, the three-way catalyst is likely to be clogged due to accumulation of deposits.

The three-way catalyst having been clogged needs to be replaced with a new one. However, a noble metal serving as a catalytic metal is expensive. Therefore, replacing the three-way catalyst with high frequency results in significantly high cost, disadvantageously.

SOLUTION TO PROBLEM

Some aspects of the present invention have a technical object to provide an engine device that has been improved as a result of study of the circumstances described above.

A first aspect of the present invention is an engine device including: a post-treatment device provided in an exhaust passage of an engine, the post-treatment device being configured to purify an exhaust gas from the engine, the post-treatment device being a three-way catalyst; and a filter case including a filter body for catching deposits in the exhaust gas, wherein the filter case is disposed, in a replaceable manner, upstream of the post-treatment device in the exhaust passage.

A second aspect of the present invention may be configured such that, in the engine device of the first aspect, the engine device further includes a temperature detecting member provided upstream of the filter body, the temperature detecting member being configured to detect a temperature of the exhaust gas, wherein a replacement timing of the filter body is determined based on a detection result from the temperature detecting member.

A third aspect of the present invention may be configured such that, in the engine device of the first aspect, the engine device further includes differential pressure detecting members between which the filter body is interposed, the differential pressure detecting members being configured to detect a pressure difference between an upstream side of the filter body and a downstream side of the filter body, wherein a replacement timing of the filter body is determined based on a detection result from the differential pressure detecting members.

Advantageous Effects of Invention

According to the aspect of the present invention, the engine device includes: the post-treatment device provided in the exhaust passage of the engine, the post-treatment device being configured to purify an exhaust gas from the engine, the post-treatment device being the three-way catalyst; and the filter case including the filter body for catching deposits in the exhaust gas, wherein the filter case is disposed, in a replaceable manner, upstream of the post-treatment device in the exhaust passage. Consequently, it is possible to catch the deposits in the exhaust gas by the filter body in the filter case, thereby making it possible to achieve reduction of the possibility that the deposits might be directly adhered to and accumulated in the post-treatment device (the possibility that the function of the post-treatment device might be impaired due to the accumulation of the deposits). Thus, the deposits are hardly accumulated in the post-treatment device. Accordingly, it is possible to elongate the life of the post-treatment device. Consequently, it is possible to significantly reduce the replacement frequency of the post-treatment device, which enables a remarkable reduction in the running cost.

Incidentally, in a case where the filter body is clogged due to the accumulation of the deposits, an exhaust gas pressure in a portion upstream of the filter body increases. Due to this, an exhaust gas temperature in a merged part increases. In this regard, employing the second aspect of the present invention makes it possible to achieve detection of the increase in the exhaust gas pressure in the portion upstream of the filter body, i.e., detection of clogging of the filter body, based on the detection result from the temperature detecting member. Consequently, it is possible for a user to know an appropriate replacement timing of the filter body and to replace the filter case including the filter body with a new one. This makes it possible to elongate the life of the purifying function of the post-treatment device.

Meanwhile, employing the third aspect of the present invention makes it possible to achieve detection of the increase in the exhaust gas pressure in the portion upstream of the filter body, i.e., detection of clogging of the filter body, based on the detection result from the differential pressure detecting members, which provides the same or similar effects to those of the second aspect.

DESCRIPTION OF EMBODIMENTS

Figure 1:
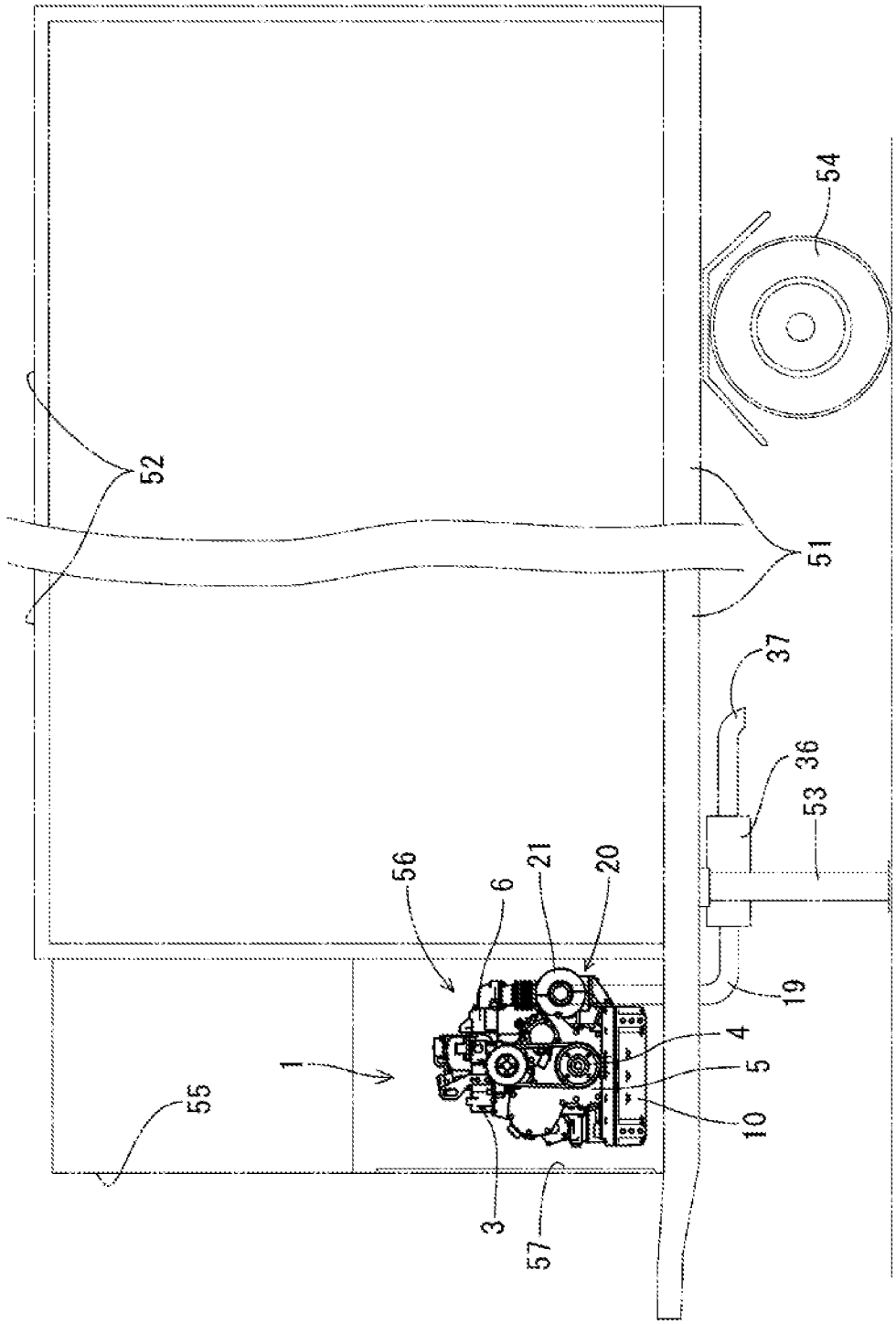
FIG. 1 A side view of a container in which a gas engine is mounted.

Embodiments of the present invention will be described below with reference to the drawings illustrating cases where the present invention is applied to a gas engine 1 that is one example of an engine mounted in a cargo container. In the following description, terms expressing a specific direction or a specific position (for example, "left and right", "top and bottom") used as needed are defined as follows. That is, a side of the gas engine 1 closer to an intake manifold 3 is expressed as a front side of the gas engine 1, a side of the gas engine 1 closer to an exhaust manifold 6 is expressed as a rear side of the gas engine 1, a side of the gas engine 1 closer to a transmission belt 14 is expressed as a left side of the gas engine 1, and a side of the gas engine 1 closer to a flywheel housing 8 is expressed as a right side of the gas engine 1. These terms are used for convenience of explanation, and do not limit the technical scope of the present invention.

Figure 3:
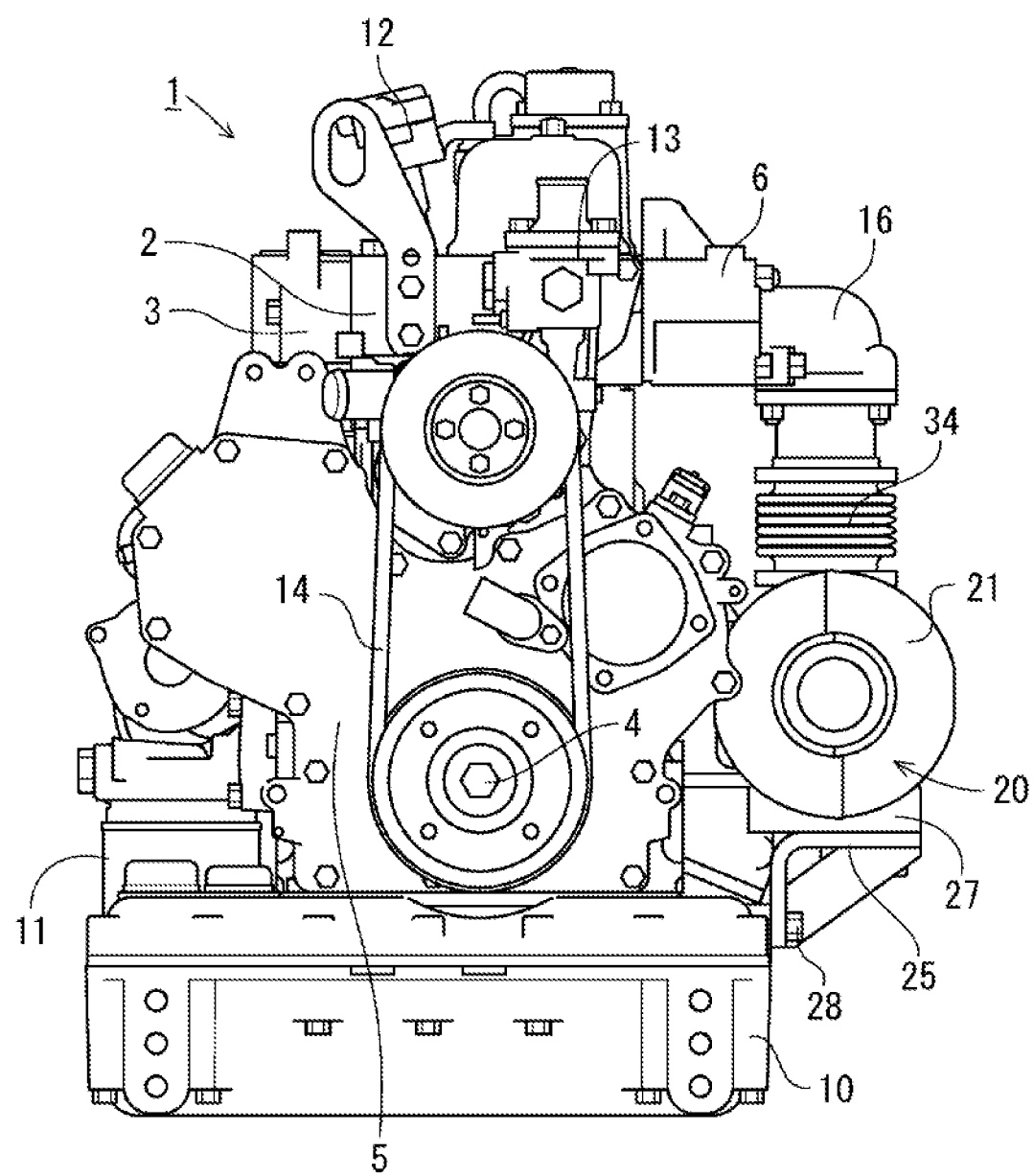
FIG. 3 A side view of the gas engine viewed from a side in which a transmission belt is disposed.
Figure 4:
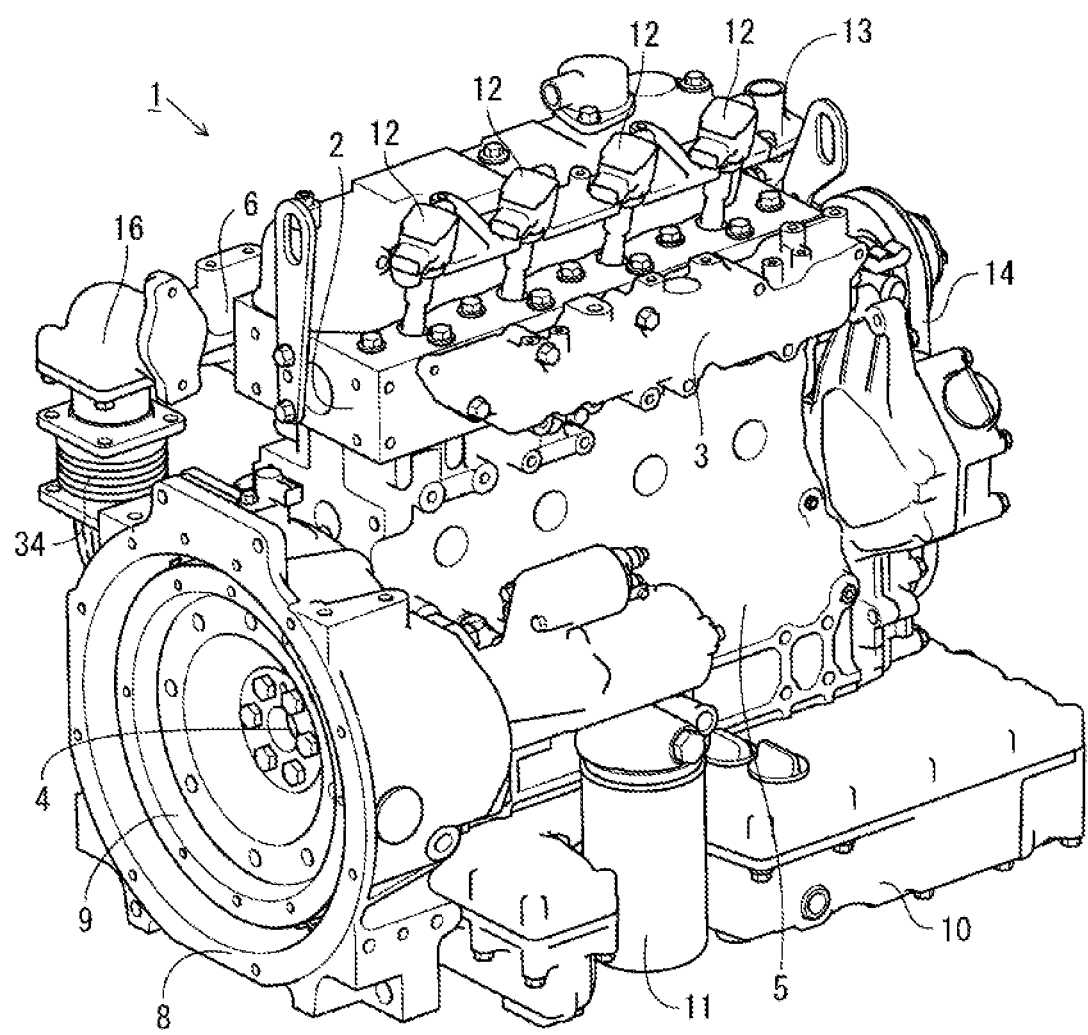
FIG. 4 A perspective view of the gas engine viewed from a side in which an intake manifold is disposed.
Figure 5:
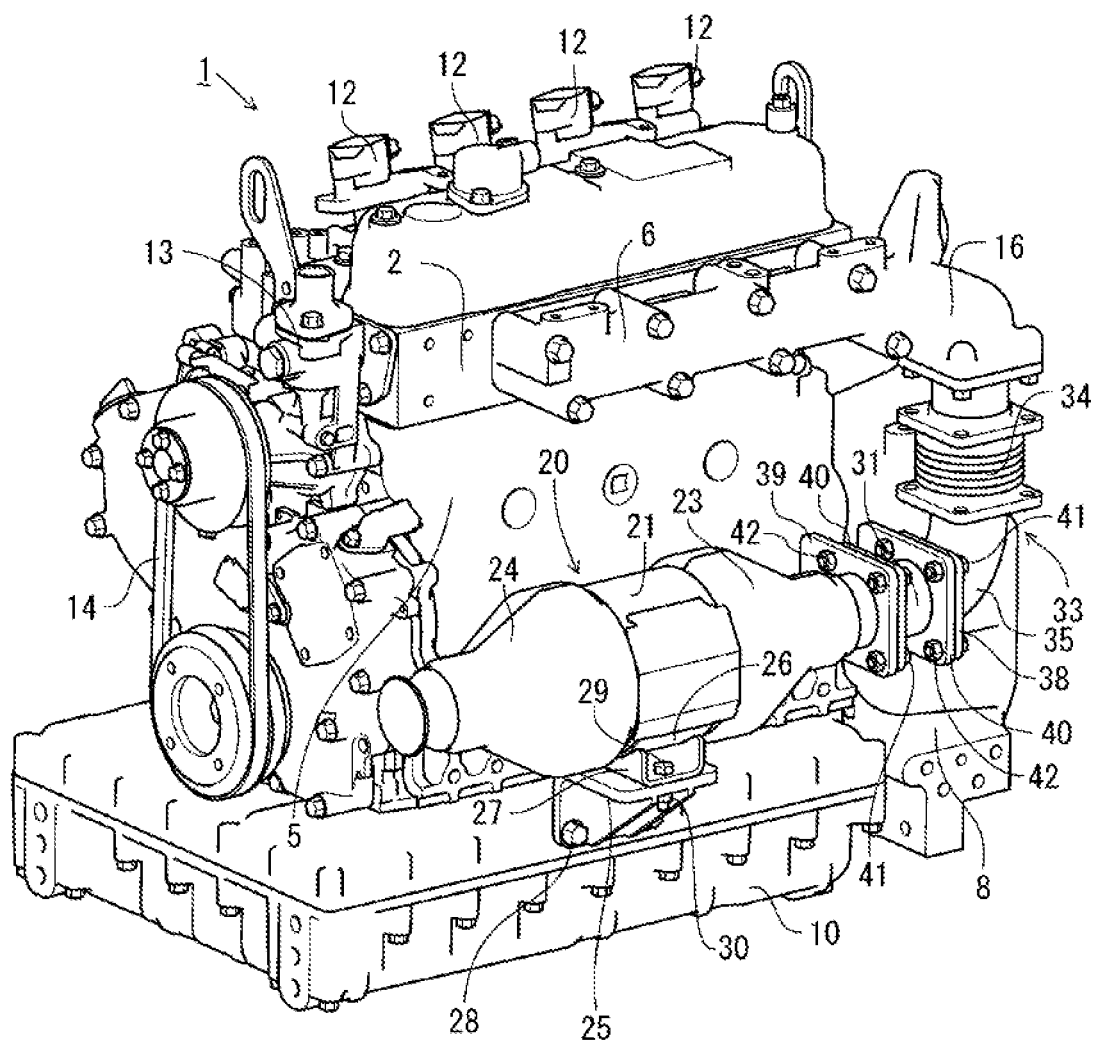
FIG. 5 A perspective view of the gas engine viewed from a side in which an exhaust manifold is disposed.

The gas engine 1 according to an embodiment of the present invention is driven by a premixed combustion method, by which a fuel gas such as a natural gas is mixed with air and the resulting mixture is combusted. As illustrated in FIGS. 3 to 5, the intake manifold 3 is provided to a front surface of a cylinder head 2 positioned in an upper portion of the gas engine 1. The cylinder head 2 is mounted above a cylinder block 5 including an engine output shaft 4 (crankshaft) and a plurality of cylinders (not illustrated). The exhaust manifold 6 is provided to a rear surface of the cylinder head 2. Left and right tip ends of the engine output shaft 4 protrude from left and right side surfaces of the cylinder block 5, respectively.

As illustrated in FIGS. 4 and 5, the flywheel housing 8 is fixed to the right side surface of the cylinder block 5. A flywheel 9 is disposed in the flywheel housing 8. The flywheel 9 is pivotally supported at the right tip end of the engine output shaft 4. A compressor 7 for refrigerant compression, which serves as an air conditioner, is attached to the flywheel housing 8 (see FIG. 2). To the compressor 7, a driving force from the gas engine 1 is transmitted via the flywheel 9.

An oil pan 10 is attached to a bottom surface of the cylinder block 5. In the present embodiment, a top surface area of the oil pan 10 is greater than a bottom surface area of the cylinder block 5. That is, the contour of the oil pan 10 extends outward of front and rear surfaces and the left side surface of the cylinder block 5 (i.e., all of side surfaces of the cylinder block 5 except for a side surface closer to the flywheel housing 8). Thus, the oil pan 10 achieves a large storage volume of engine oil. Accordingly, a large amount of engine oil can be stored in the oil pan 10. Consequently, even in a case where the gas engine 1 is continuously driven for a long period, it is possible to prevent shortage of engine oil.

Lubrication oil in the oil pan 10 is sucked by an oil pump (not illustrated) driven by rotation of the engine output shaft 4, and is supplied to lubricated parts (e.g., the cylinders) of the gas engine 1 through, e.g., an oil filter 11 attached to a lower part of the front surface of the cylinder block 5. Then, the lubrication oil thus supplied to the lubricated parts is returned to the oil pan 10.

The gas engine 1 is connected to a gas fuel tank mounted in a trailer vehicle body 51 (described later) or a cargo container 52 (described later) via a vaporizer and a gas valve unit, although detailed illustration thereof is omitted. In the gas fuel tank, a fuel gas is stored. The vaporizer vaporizes the fuel in the gas fuel tank, and supplies the fuel in the vaporized state to the gas engine 1 via the gas valve unit.

The gas valve unit is configured to collect part of the fuel gas returned from the gas engine 1 and to return the part of the fuel gas to the gas fuel tank. In addition, the gas valve unit is capable of detecting an internal gas pressure to check for, e.g., gas leakage.

The gas engine 1 includes a plurality of cylinders arranged in series in the cylinder block 5. The cylinders in the cylinder block 5 are communicated with the intake manifold 3 adjacent to the front surface of the cylinder head 2. The intake manifold 3 is connected to an air cleaner for purifying outside air by removing dust therefrom and taking the outside air through an intake throttle valve and a mixer, although detailed illustration thereof is omitted. The mixer is connected to a gas supply device configured to supply a combustion gas. The outside air thus purified through the dust removal by the air cleaner and the combustion gas from the gas supply device are stirred and mixed by the mixer. The resulting premixed gas is sent to the intake manifold 3 through the intake throttle valve, and is then supplied to the cylinders from the intake manifold 3.

In a front portion (a portion closer to the intake manifold 3) of a top surface of the cylinder head 2, ignition devices 12 for igniting the premixed gas in the cylinders are provided to their respective cylinders. Each of the ignition devices 12 causes a high voltage to occur a spark discharge in a corresponding one of the cylinders to burn the premixed gas in the cylinder. As a result of the burning of the premixed gas, a piston in each cylinder moves in a reciprocating motion, whereby the engine output shaft 4 is rotated. Consequently, a driving force of the gas engine 1 is generated.

In the cylinder block 5 and a radiator (not illustrated), a coolant pump 13 for recirculating coolant is provided. In the present embodiment, the coolant pump 13 is attached to the left side of the gas engine 1. The coolant pump 13 is connected to the left tip end of the engine output shaft 4 via the transmission belt 14 and the like. A rotational driving force from the engine output shaft 4 is transferred to the coolant pump 13 through the transmission belt 14, so that the coolant pump 13 is driven. Consequently, the coolant is recirculated in the cylinder block 5 and the radiator.

Figure 6:
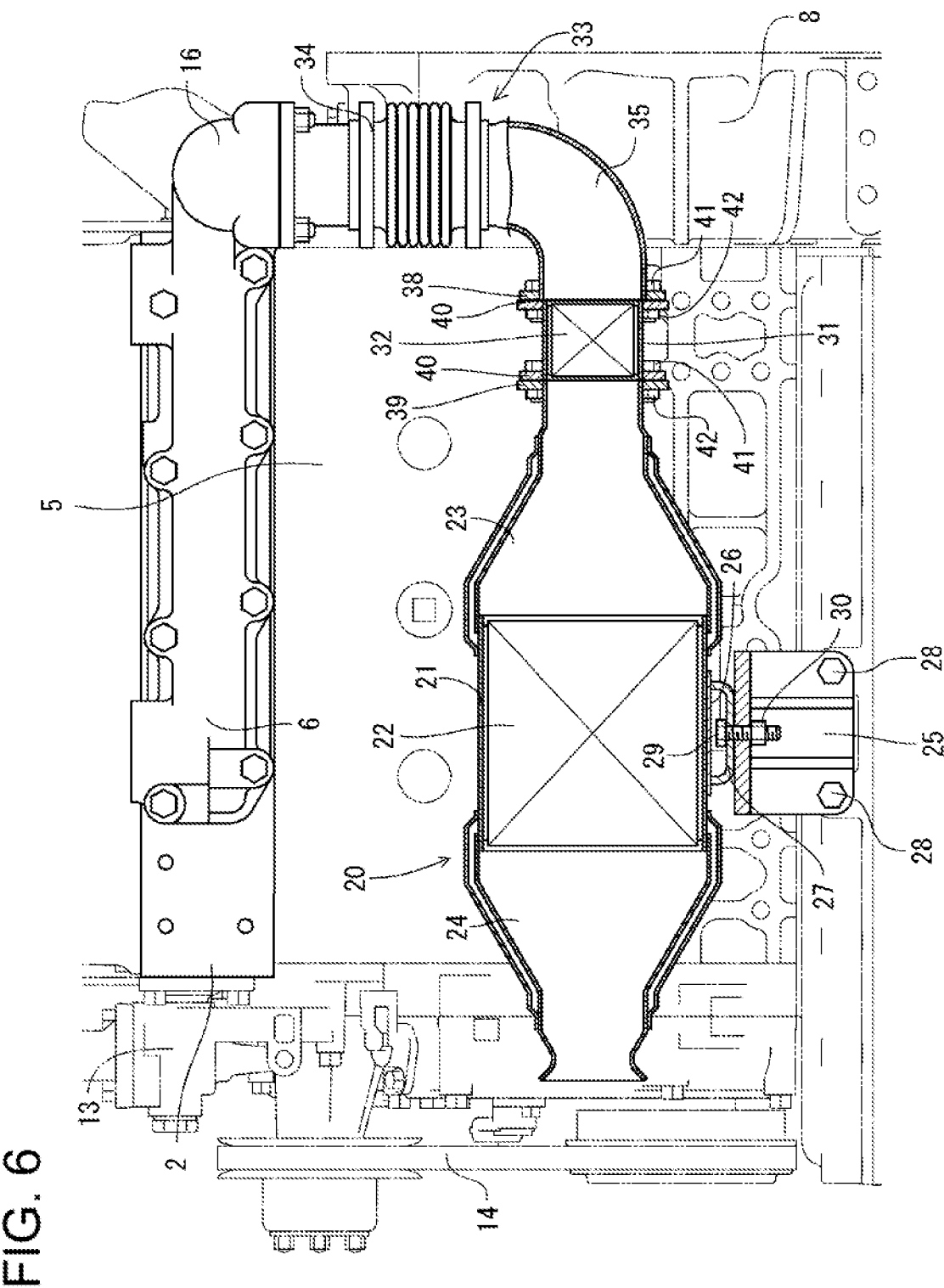
FIG. 6 A cross-sectional view of a post-treatment device and a filter case according to an embodiment of the present invention.

Incidentally, the cylinders in the cylinder block 5 are communicated not only with the intake manifold 3 but also with the exhaust manifold 6 adjacent to the rear surface of the cylinder head 2. As illustrated in FIGS. 3, 5, and 6, a post-treatment device 20 for purifying an exhaust gas from the gas engine 1 is provided in an exhaust passage of the gas engine 1. An exhaust gas emitted from the cylinders of the gas engine 1 to the exhaust manifold 6 is discharged from an exhaust pipe 19 (see FIG. 1) to the outside through the post-treatment device 20 and the like. A passage extending from the exhaust manifold 6 to the exhaust pipe 19 through the catalyst case 21 and the like is the exhaust passage of the gas engine 1. The post-treatment device 20 of the present embodiment employs a so-called three-way catalyst method. The post-treatment device 20 simultaneously purifies three components (hydrocarbon (HC), carbon monoxide (CO), nitrogen oxide (NOx)) in the exhaust gas from the gas engine 1.

The post-treatment device 20 includes the catalyst case 21 extending in a left-and-right direction in parallel with the engine output shaft 4 of the gas engine 1 to have a long, substantially cylindrical shape. The catalyst case 21 accommodates a three-way catalyst 22 configured to simultaneously purify the three components (hydrocarbon (HC), carbon monoxide (CO), nitrogen oxide (NOx)) in the exhaust gas. The three-way catalyst 22 of the present embodiment includes a base material which has a honeycomb structure constituted by a large number of cells partitioned by porous partition walls and which carries main catalysts that are catalytic noble metals such as platinum (Pt), rhodium (Rh), and palladium (Pd) and a promoter such as ceria ($CeO_2$, cerium oxide) through, e.g., wash coat treatment. With the configuration described above, it is possible to reduce the contents of hydrocarbon (HC), carbon monoxide (CO), nitrogen oxide (NOx) in the exhaust gas from the gas engine 1. To a right side (one end in an exhaust gas traveling direction) of the catalyst case 21, an exhaust gas inlet pipe 23 for taking an exhaust gas is attached. To a left side (the other end in the exhaust gas traveling direction) of the catalyst case 21, an exhaust gas outlet pipe 24 for discharging the exhaust gas is attached.

As illustrated in FIGS. 3, 5, and 6, the post-treatment device 20 is disposed in an internal corner between a rear surface of the cylinder block 5 and a rear portion of a top surface of the oil pan 10. The catalyst case 21 is supported by a rear surface of the oil pan 10 via a fixing bracket 25. In the present embodiment, a receiving frame 27 is fixed by soldering to a bottom surface of the catalyst case 21 via a reinforcing plate 26. A vertical plate of the fixing bracket 25 is fastened to the rear surface of the oil pan 10 by a bolt 28. A horizontal plate of the fixing bracket 25 is fastened to a bottom surface of the receiving frame 27 by a bolt 29 and a nut 30.

A filter case 31 having a substantially cylindrical shape is disposed, in a replaceable manner, upstream of the post-treatment device 20 in the exhaust passage of the gas engine 1. In this configuration, the filter case 31 is detachably connected between the post-treatment device 20 and an exhaust gas introduction pipe 33 that extends from the exhaust manifold 6. The filter case 31 includes a filter body 32 for catching deposits (residues (fuel products) of, e.g., engine oil) in an exhaust gas. The filter body 32 has a honeycomb structure constituted by a large number of cells partitioned by porous partition walls, similarly to the three-way catalyst 22. However, unlike the three-way catalyst 22, the filter body 32 does not carry catalytic noble metals such as platinum (Pt), rhodium (Rh), and palladium (Pd).

By the filter body 32 thus provided, the deposits in the exhaust gas are caught in advance before the deposits are introduced into the three-way catalyst 22 in the catalyst case 21. Consequently, it is possible to achieve reduction of the possibility that the deposits might be directly adhered to and accumulated in the three-way catalyst 22 (the possibility that the function of the three-way catalyst 22 might be impaired due to the accumulation of the deposits). Thus, the deposits are hardly accumulated in the three-way catalyst 22. Therefore, it is possible to elongate the life of the three-way catalyst 22. Consequently, it is possible to significantly reduce the replacement frequency of the post-treatment device 20 (the catalyst case 21 with the three-way catalyst 22), which enables a remarkable reduction in the running cost.

In the present embodiment, an intake joint 16 is integrally formed at a right end of the exhaust manifold 6. The intake joint 16 of the exhaust manifold 6 is connected to the exhaust gas inlet pipe 23 via a bellows expansion pipe 34 and an elbow steel pipe 35, both of which constitute the exhaust gas introduction pipe 33, and the filter case 31. That is, the intake joint 16 of the exhaust manifold 6 is fastened to an upper end of the bellows expansion pipe 34, which extends vertically. A lower end of the bellows expansion pipe 34 is fastened to an upper end of the elbow steel pipe 35. A left end of the elbow steel pipe 35 is fastened to a right end of the exhaust gas inlet pipe 23 via the filter case 31. Since the exhaust gas inlet pipe 23 is communicated with the exhaust manifold 6 of the gas engine 1, an exhaust gas is introduced into the post-treatment device 20 through the filter case 31. A left end of the exhaust gas outlet pipe 24, which is attached to the left side of the catalyst case 21, is connected to a silencer 36 and a tail pipe 37 via the exhaust pipe 19 (see FIG. 1). Thus, the exhaust gas purified while passing through the post-treatment device 20 (the catalyst case 21 with the three-way catalyst 22) is discharged to the outside through the exhaust pipe 19, the silencer 36, and the tail pipe 37.

As described above, the filter case 31 is detachably connected between the exhaust gas introduction pipe 33 and the post-treatment device 20. In the present embodiment, an upstream flange 38 protruding outward is attached to an opening end at the left end (downstream side) of the elbow steel pipe 35. A downstream flange 39 protruding outward is attached to an opening end at the right end (upstream side) of the exhaust gas inlet pipe 23. Connection flanges 40 protruding outward are respectively attached to opening ends at left and right ends (both sides in the exhaust direction) of the filter case 31.

The filter case 31 is interposed between the left end of the elbow steel pipe 35 and the right end of the exhaust gas inlet pipe 23. The upstream flange 38 and an upstream one of the connection flanges 40 are disposed to face each other via a gasket (not illustrated), and these flanges 38 and 40 are fastened to each other by multiple sets of bolts 41 and nuts 42. The downstream flange 39 and a downstream one of the connection flanges 40 are disposed to face each other via a gasket (not illustrated), and these flanges 39 and 40 are fastened to each other by multiple sets of bolts 41 and nuts 42. Thus, the elbow steel pipe 35 (exhaust gas introduction pipe 33), the filter case 31, and the exhaust gas inlet pipe 23 (post-treatment device 20) are detachably connected to each other.

Figure 7:
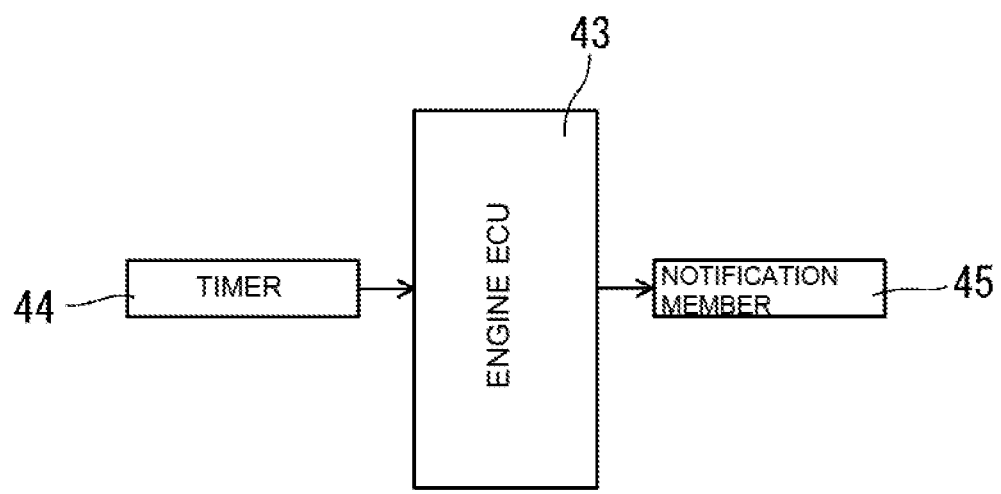
FIG. 7 A functional block diagram for determination of a replacement timing of a filter body.

Incidentally, the gas engine 1 of the present embodiment includes an engine ECU 43 that is a control device responsible for drive control of the gas engine 1. The engine ECU 43 includes a CPU for executing various arithmetic processes and controls, as well as a ROM in which various data are fixedly stored, an EEPROM in which various data can be rewritten and stored, a RAM in which various data are temporarily stored, an input/output interface, and the like, although detailed illustration thereof is omitted. The engine ECU 43 is disposed in or near the gas engine 1. As illustrated in FIG. 7, the engine ECU 43 is connected to a timer 44 for time measurement configured to measure a cumulative driving time of the gas engine 1 and to a notification member 45 such as a buzzer, a lamp, or a display.

In the configuration described above, if a cumulative driving time of the gas engine 1 measured (counted) by the timer 44 exceeds a preset time (for example, approximately 5000 hours), it is considered that the filter body 32 tends to be clogged due to accumulation of deposits in the filter body 32. Therefore, the notification member 45 may give notice that it is time to replace the filter case 31 including the filter body 32 with a new one. After the replacement of the filter case 31, a counting value of the timer 44 is reset.

As is clear from the above description and FIGS. 5 and 6, the engine device includes: the post-treatment device 20 provided in the exhaust passage of the gas engine 1, the post-treatment device 20 being configured to purify an exhaust gas from the gas engine 1; the oil pan 10 provided in a bottom of the gas engine 1; and the filter case 31 including the filter body 32 for catching deposits in the exhaust gas, wherein the filter case 31 is disposed, in a replaceable manner, upstream of the post-treatment device 20 in the exhaust passage. Consequently, it is possible to catch the deposits in the exhaust gas by the filter body 32 in the filter case 31, thereby making it possible to achieve reduction of the possibility that the deposits might be directly adhered to and accumulated in the post-treatment device 20 (the possibility that the function of the post-treatment device 20 might be impaired due to the accumulation of the deposits). Thus, the deposits are hardly accumulated in the post-treatment device 20. Therefore, it is possible to elongate the life of the post-treatment device 20. Consequently, it is possible to significantly reduce the replacement frequency of the post-treatment device 20, which enables a remarkable reduction in the running cost.

Figure 2:
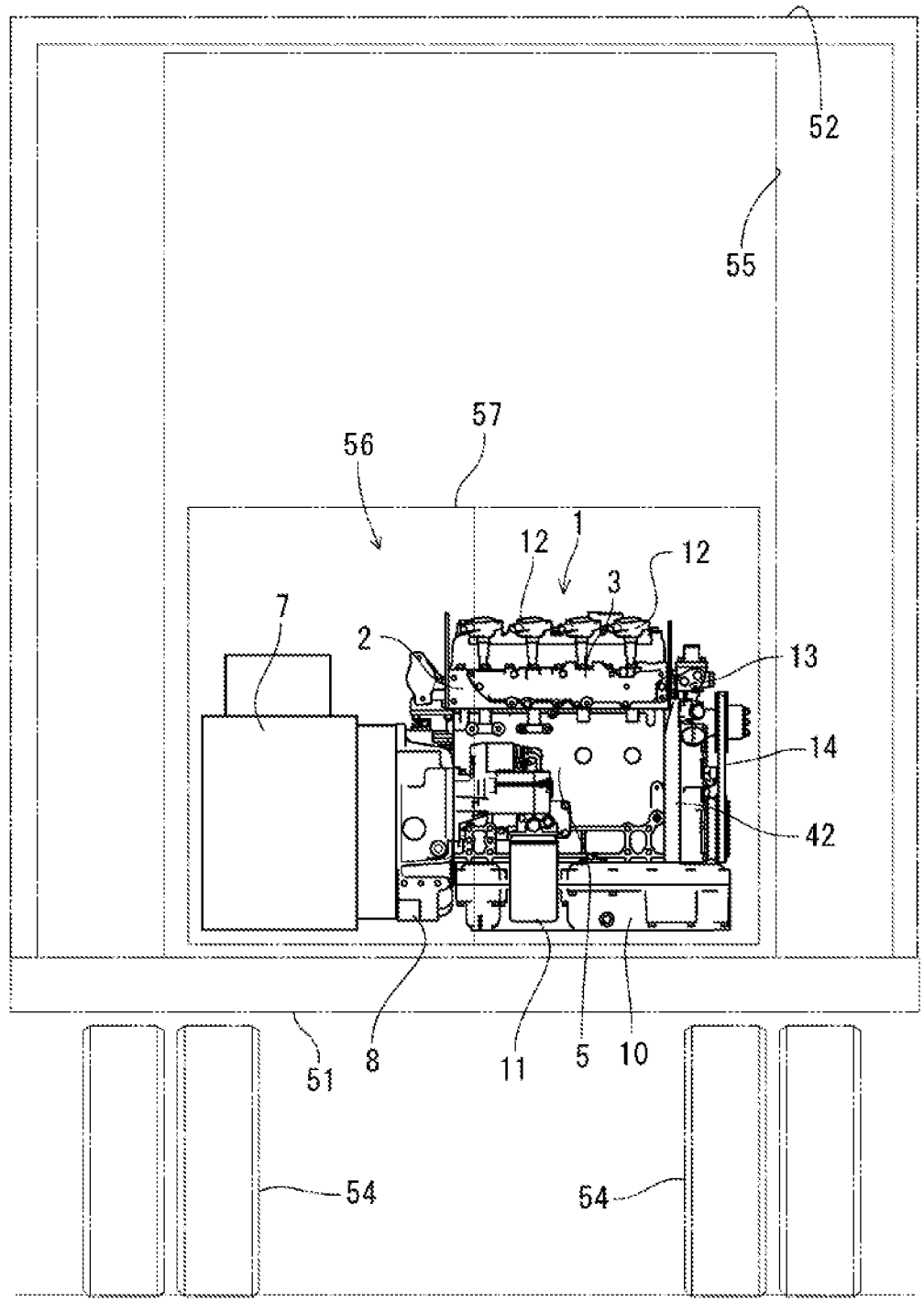
FIG. 2 An elevation view of the container in which the gas engine is mounted.

Next, with reference to FIGS. 1 and 2, one example of a use mode of the gas engine 1 will be described. As illustrated in FIGS. 1 and 2, the cargo container 52 which is shaped in a rectangular box and with which a cargo such as a frozen cargo is transported is mounted in the trailer vehicle body 51 towed by a tractor (not illustrated). The trailer vehicle body 51 can be stored with the trailer vehicle body 51 being horizontally supported by a front supporting leg 53 that is storable and by rear wheels 54. The trailer vehicle body 51 can be towed by the tractor with a front portion of the trailer vehicle body 51 being connected to a rear portion of the tractor and the supporting leg 53 being stored.

A front surface of the cargo container 52 is provided with an air conditioner housing 55 for the air conditioner. In the air conditioner housing 55, the air conditioner (not illustrated) for controlling a temperature in the cargo container 52 is accommodated. Below the air conditioner housing 55, an engine room 56 is provided. In the engine room 56, the gas engine 1 and the compressor 7, which is a part of the air conditioner, are disposed. The gas engine 1 drives the compressor 7 to cause the compressor 7 to compress a refrigerant of the air conditioner. Consequently, the temperature in the cargo container 52 is maintained at a cold storage temperature (for example, −20° C.) suitable for preservation of a frozen cargo. In a front surface of the engine room 56, a maintenance door 57 is openably provided. The gas engine 1 is positioned in a left portion in the engine room 56, and the compressor 7 is positioned in a right portion in the engine room 56. When the maintenance door 57 is opened, a front surface (a surface closer to the intake manifold) of the gas engine 1 is exposed.

Figure 8:
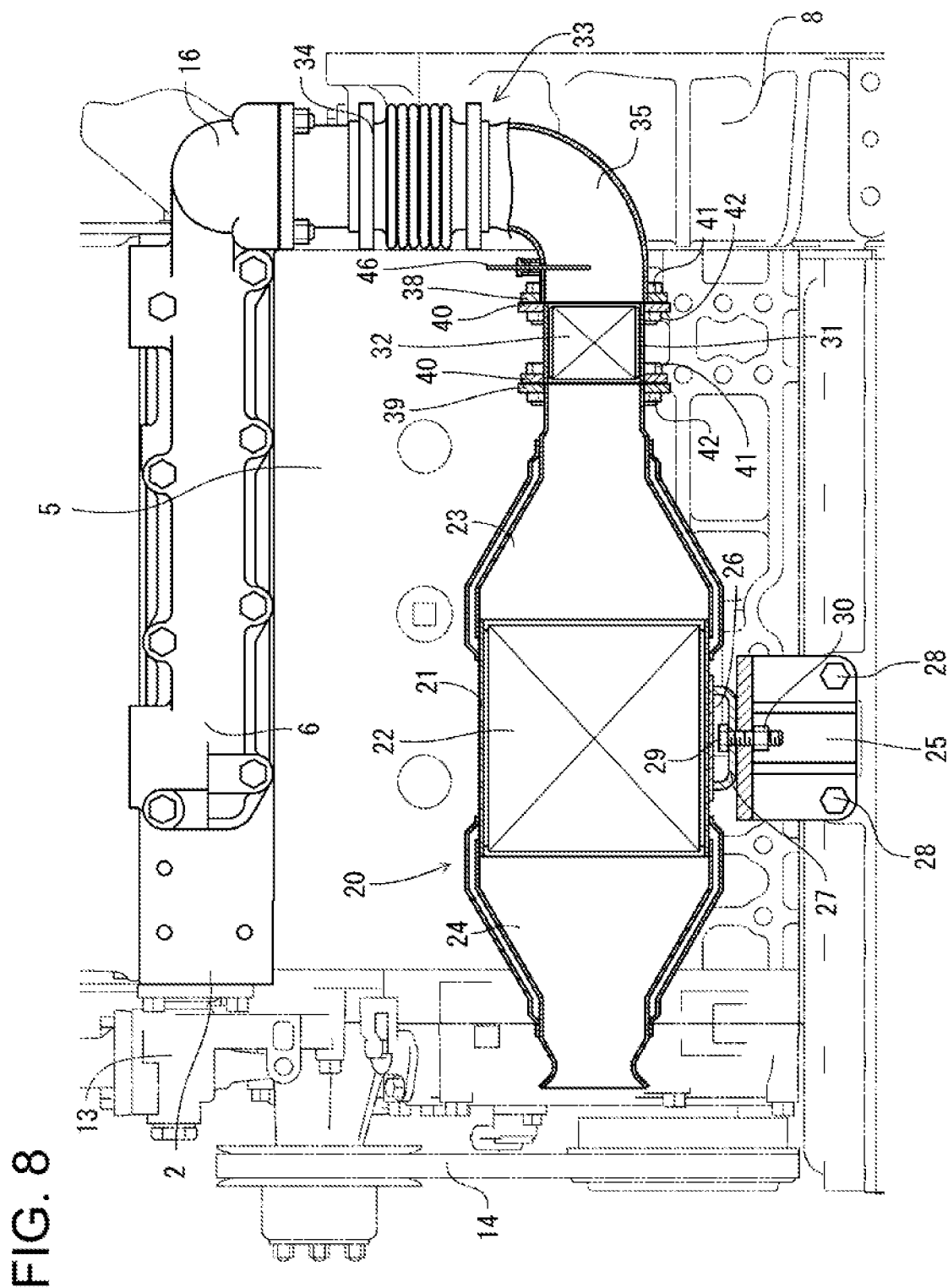
FIG. 8 An enlarged cross-sectional view of a filter case according to a first modification.
Figure 9:
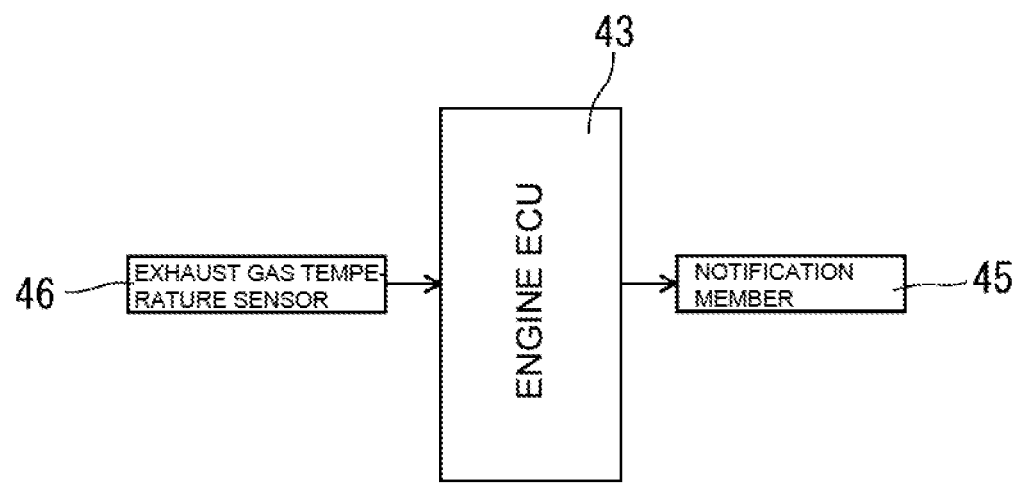
FIG. 9 A functional block diagram for determination of a replacement timing of a filter body.

Next, with reference to FIGS. 8 and 9, a first modification of the structure for catching deposits in an exhaust gas will be described. The first modification includes an exhaust gas temperature sensor 46 provided upstream of a filter body 32, the exhaust gas temperature sensor 46 being a temperature detecting member for detecting a temperature of an exhaust gas. In this configuration, the exhaust gas temperature sensor 46 is attached to a left end of an elbow steel pipe 35. As illustrated in FIG. 9, in the first modification, instead of the timer 44 in the above-described embodiment, the exhaust gas temperature sensor 46 is connected to an engine ECU 43. Except for those described above, the configuration of the deposit catching structure of the first modification is the same as that of the above-described embodiment.

In the configuration described above, if an exhaust gas temperature detected by the exhaust gas temperature sensor 46 exceeds a preset temperature, such an increase in the exhaust gas temperature is considered to be caused by an increase in an exhaust gas pressure in a portion upstream of the filter body 32 since the filter body 32 tends to be clogged due to accumulation of deposits in the filter body 32. Thus, a notification member 45 may give notice that it is time to replace a filter case 31 including the filter body 32 with a new one. Consequently, it is possible for a user to know an appropriate replacement timing of the filter body 32 and to replace the filter case 31 including the filter body 32 with a new one. This makes it possible to elongate the life of the purifying function of the post-treatment device 20.

Figure 10:
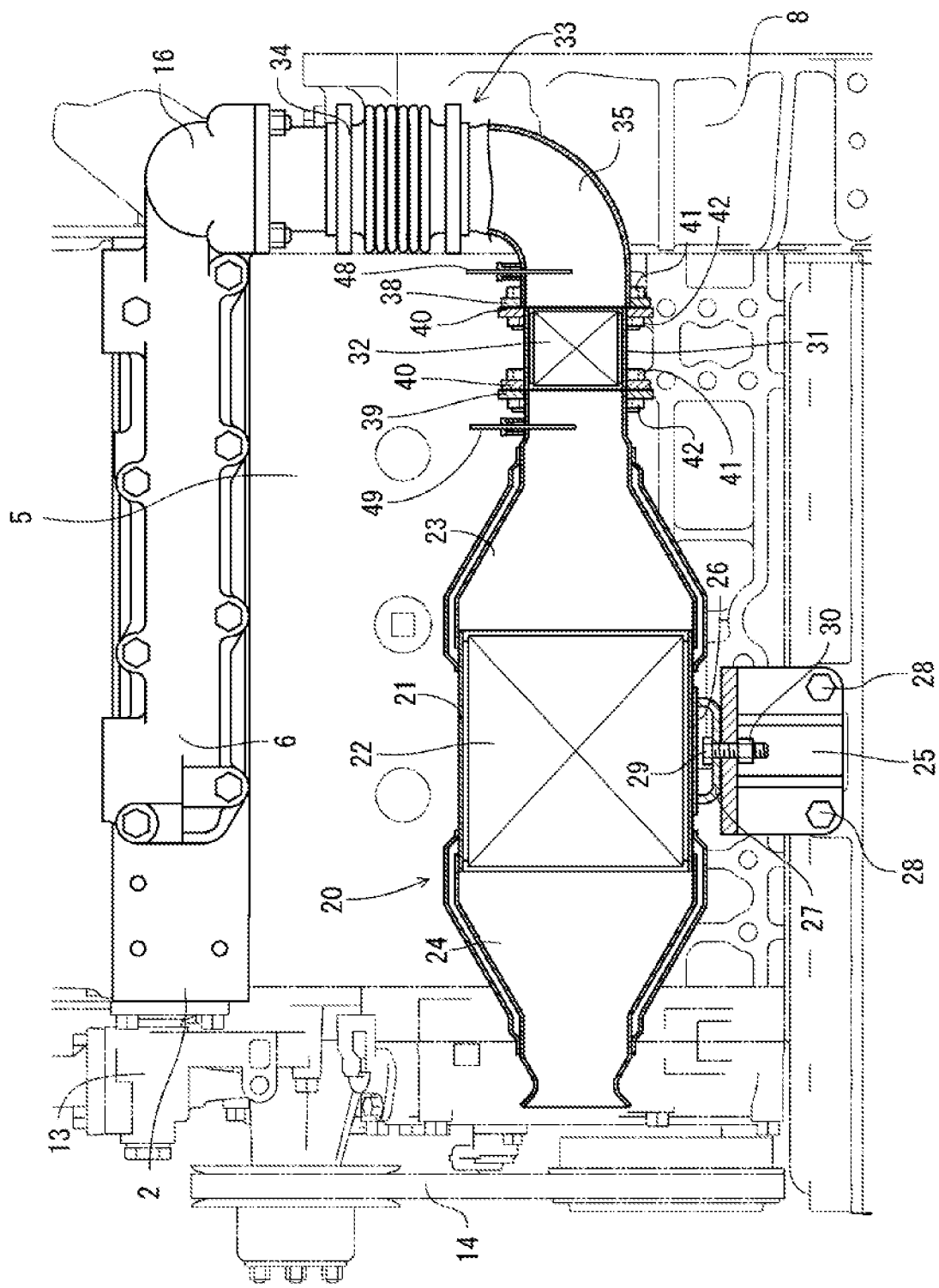
FIG. 10 An enlarged cross-sectional view of a filter case according to a second modification.
Figure 11:
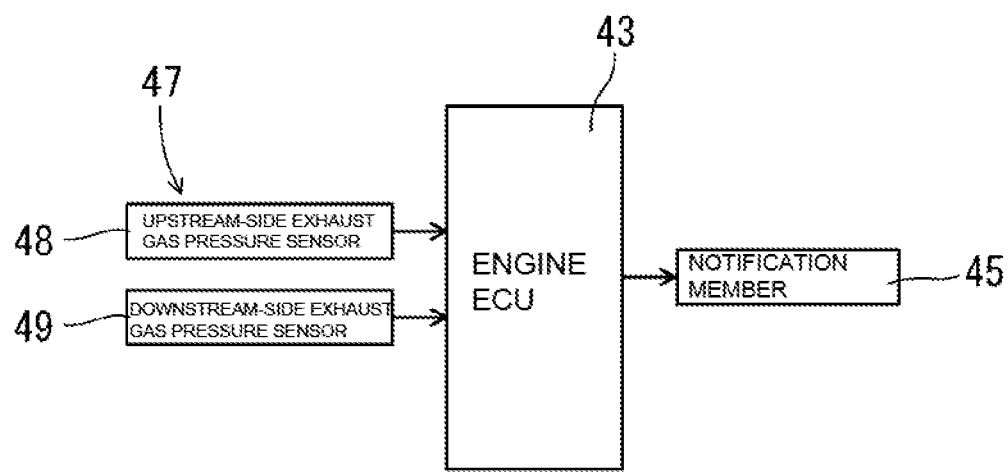
FIG. 11 A functional block diagram for determination of a replacement timing of a filter body.

Next, with reference to FIGS. 10 and 11, a second modification of the structure for catching deposits in an exhaust gas will be described. The second modification includes exhaust gas differential pressure sensors 47 between which a filter body 32 is interposed, the exhaust gas differential pressure sensors 47 being differential pressure detecting members for detecting a pressure difference between an upstream side of the filter body 32 and a downstream side of the filter body 32. In this configuration, an upstream-side exhaust gas pressure sensor 48 included in the exhaust gas differential pressure sensors 47 is attached to a left end of an elbow steel pipe 35, and a downstream-side exhaust gas pressure sensor 49 included in the exhaust gas differential pressure sensors 47 is attached to a right end of an exhaust gas inlet pipe 23. As illustrated in FIG. 11, in the second modification, instead of the timer 44 in the above-described embodiment, the exhaust gas differential pressure sensors 47 (the upstream-side exhaust gas pressure sensor 48 and the downstream-side exhaust gas pressure sensor 49) are connected to an engine ECU 43. Except for those described above, the configuration of the deposit catching structure of the second modification is the same as that of the above-described embodiment.

In the configuration described above, if a pressure difference detected by the exhaust gas differential pressure sensors 47 exceeds a preset value, such a situation is considered to be caused by an increase in an exhaust gas pressure in a portion upstream of the filter body 32 since the filter body 32 tends to be clogged due to accumulation of deposits in the filter body 32. Thus, a notification member 45 may give notice that it is time to replace a filter case 31 including the filter body 32 with a new one. Consequently, it is possible for a user to know an appropriate replacement timing of the filter body 32 and to replace the filter case 31 including the filter body 32 with a new one. This makes it possible to elongate the life of the purifying function of the post-treatment device 20, in the same manner as the first modification.

The present invention is not limited to the above-described embodiments, but may be embodied in various modes. The configurations of the parts and portions are not limited to those in the illustrated embodiments, and can be modified and changed in various ways unless such modifications and changes depart from the scope of the present invention.

REFERENCE SIGNS LIST 1 gas engine
3 intake manifold
6 exhaust manifold
10 oil pan
16 intake joint
20 post-treatment device
21 catalyst case
22 three-way catalyst
23 exhaust gas inlet pipe
24 exhaust gas outlet pipe
31 filter case
32 filter body
30 exhaust gas introduction pipe
43 engine ECU
44 timer
45 notification member
46 exhaust gas temperature sensor
47 exhaust gas differential pressure sensor
48 upstream-side exhaust gas pressure sensor
49 downstream-side exhaust gas pressure sensor

The invention claimed is:

1. An engine device comprising:
a post-treatment device provided in an exhaust passage of an engine, the post-treatment device configured to purify an exhaust gas from the engine; and
a filter case disposed, in a replaceable manner separate from the post-treatment device, upstream of the post-treatment device in the exhaust passage, the filter case is at both ends thereof respectively provided with connecting flanges and includes a filter body configured to catch deposits in the exhaust gas;
an oil pan coupled to the post-treatment device via a fixing bracket, wherein:
one of the connecting flanges is connected to a flange of an exhaust gas introduction pipe; and
another of the connecting flanges is connected to a flange of an exhaust gas inlet of the post-treatment device.

2. The engine device according to claim 1, further comprising:
a temperature detecting member provided upstream of the filter body, the temperature detecting member being configured to detect a temperature of the exhaust gas, wherein
a replacement timing of the filter body is determined based on a detection result from the temperature detecting member.

3. The engine device according to claim 1, further comprising:
differential pressure detecting members between which the filter body is interposed, the differential pressure detecting members being configured to detect a pressure difference between an upstream side of the filter body and a downstream side of the filter body, wherein
a replacement timing of the filter body is determined based on a detection result from the differential pressure detecting members.

4. An engine device comprising:
a post-treatment device provided in an exhaust passage of an engine, the post-treatment device configured to purify an exhaust gas from the engine; and
a filter case disposed, in a replaceable manner separate from the post-treatment device, upstream of the post-treatment device in the exhaust passage, the filter case including:
a filter body configured to catch deposits in the exhaust gas;
a first connecting flange positioned at a first end of the filter case; and
a second connecting flange positioned at a second end of the filter case;
an exhaust gas introduction pipe disposed upstream of the filter case; and
an oil pan coupled to the post-treatment device via a fixing bracket, wherein:
the first connecting flange is connected to a downstream flange of the exhaust gas introduction pipe; and
the second connecting flange is connected to an upstream flange of an exhaust gas inlet of the post-treatment device.

5. The engine device according to claim 4, wherein the post-treatment device further comprises:
a catalyst case;
an exhaust gas inlet pipe coupled to the catalyst case; and
an exhaust gas outlet pipe coupled to the catalyst case.

6. The engine device according to claim 5, wherein:
the exhaust gas inlet pipe is positioned upstream of the catalyst case.

7. The engine device according to claim 5, wherein:
the exhaust gas outlet pipe is positioned downstream of the catalyst case.

8. The engine device according to claim 4, wherein the fixing bracket comprises:

a vertical plate fastened to a rear surface of the oil pan; and a horizontal plate fastened to a bottom surface of the post-treatment device.

9. The engine device according to claim 4, wherein the post-treatment device is configured to be positioned between a rear surface of a cylinder block and a rear portion of a top surface of the oil pan.

10. The engine device according to claim 4, further comprising:

an exhaust manifold configured to receive the exhaust gas of the engine; and wherein the post-treatment device is disposed between the exhaust manifold and the oil pan.

* * * * *